6593X
W. H. Mackrell,
Shutter Fastener.
Patented June 13, 1831.
No. 2.
No. 3.
No. 1.
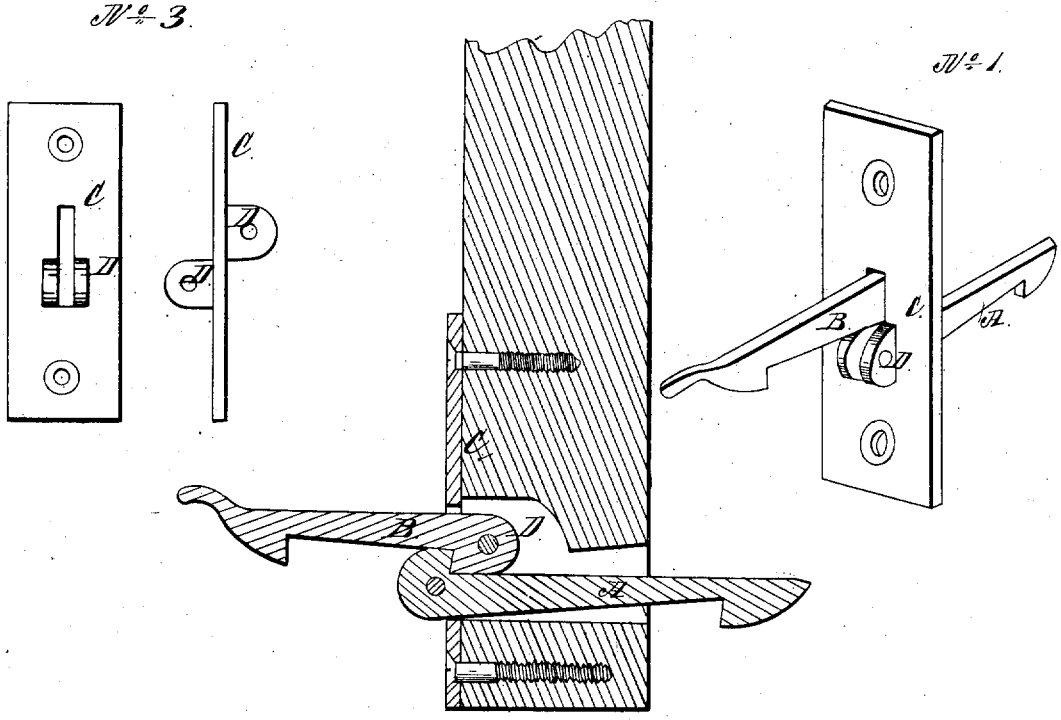
N. PETERS, PHOTO-LITHOGRAPHER, WASHINGTON, D. C.

6593X June 13 1891 21

William H. Mackrell, Brunswick New York,
— Letters Patent —

The Schedule referred to in these Letters Patent, and making part of the same containing a description in the words of the said William H. Mackrell himself, of his Improvement in Machinery for fastening and securing Window Shutters and Blinds —

To all to whom these presents shall come — William H. Mackrell of Brunswick, in the County of Kings & State of New York. Sends Greeting — Be it known that I, William H. Mackrell, have invented constructed and applied to use, a new and useful improvement in machinery, for fastening and securing Window Shutters and Blinds; Said improvement and its manner of use, are as follows. to wit — A plate of Brass or other material, about two inches in Length and one & half inch width, and a mortise through the plate with a projection on each side, sufficient to receive the rivets, for fastening an inside and outside catch or drop, with suitable holes for the purpose of screwing to the shutter or blind — The outside catch or drop, when the shutter or blind is shut being rivetted through the inner projection of the plate, & of a suitable length to pass through the shutter or blind, to receive a hook or catch made fast to the house. The inside catch or drop being rivetted through the outside projection of the plate, lying on or under the upper or outside catch or drop, in such a manner, as by raising the inside catch or drop, it will raise the outside one, — and the outside drop or catch, will not raise the inside drop or catch when shut; and both must pass one mortise through the plate, which is attached to the shutter or blind; and both are rivetted to the same —

What I claim as my invention & improvement in the aforesaid described Window Shutter or blind fastener, is the catch or drops being placed in such a manner, that the inside catch or drop, which makes the shutter or blind fast to the

{15 Re issued 10th December 1839}

Drawing

6B93X sill of the house, by lifting the inside catch or drop, will lift the outside drop or catch; and the outside drop or catch which will move fast to the catch secured to the house, will not lift the inside drop or catch, when the shutter or blind is shut.

Dated New York, April 20th 1891.

Witnesses
Jno. A. Steele
Lewis Pat.

William H. Maxwell (Patented June 12th 1891.)

(425)